United States Patent [19]

Huber et al.

[11] Patent Number: 4,728,367

[45] Date of Patent: Mar. 1, 1988

[54] EXTRUSION METHOD AND APPARATUS FOR ACID TREATMENT OF CELLULOSIC MATERIALS

[75] Inventors: Gordon R. Huber; LaVon G. Wenger; Bobbie W. Hauck; Galen J. Rokey, all of Sabetha; Lawrence E. Schmelzle, Oneida; Timothy R. Hartter, Sabetha, all of Kans.

[73] Assignee: Wenger Manufacturing, Inc., Sabetha, Kans.

[21] Appl. No.: 914,553

[22] Filed: Oct. 1, 1986

Related U.S. Application Data

[63] Continuation of Ser. No. 697,416, Jan. 31, 1985, abandoned, which is a continuation of Ser. No. 467,878, Feb. 18, 1983, abandoned.

[51] Int. Cl.[4] .......................... C13K 1/02; C13K 1/06; B01J 3/03

[52] U.S. Cl. .......................................... 127/1; 127/37; 425/145; 425/146; 425/376 A

[58] Field of Search ...................... 127/1, 37; 425/145, 425/146, 376 A; 264/40.7, 211.21; 366/79; 137/243, 243.3, 243.4; 251/124

[56] References Cited

U.S. PATENT DOCUMENTS

| | | | |
|---|---|---|---|
| 1,033,956 | 7/1912 | Shapley | 137/243.3 |
| 1,990,601 | 2/1935 | Godsey | 137/243 |
| 2,681,871 | 6/1954 | Wallace | 127/1 |
| 2,880,959 | 4/1959 | Falconer | 251/124 X |
| 3,061,877 | 11/1962 | Custers et al. | 425/77 |
| 3,501,810 | 3/1970 | Powell | 425/146 |
| 4,060,362 | 11/1977 | Wilson | 425/145 |
| 4,286,058 | 8/1981 | Wenger et al. | 127/38 |
| 4,316,748 | 2/1982 | Rugg et al. | 127/37 |
| 4,390,375 | 6/1963 | Rugg et al. | 127/37 |

FOREIGN PATENT DOCUMENTS

| | | |
|---|---|---|
| 8101561 | 9/1981 | Brazil . |
| 7972233 | 11/1977 | Japan . |

OTHER PUBLICATIONS

The Production of Alcohol Fuels via Acid Hydrolysis Extrusion Technology, Randall Noon, P. E. and Thomas Hochstetler, revised May '82; Energy Research & Resource Development, 214 W. 6th St., Topeka, Kansas.

Hydrolysis of Birchwood with Concentrated Sulfuric Acid at Low Hydromodulus, Sokolov, T; Vidimski, E; Velkova, R; Malamov, K. (Vissh Khim-Tekhnol. Inst., 1981; Chem Abstracts, 96:87247q).

Nitrogen Metabolism in Fattening Bull Calves Fed Extruded Urea and Sawdust, Kalachnyuk, G. I.; Vengrin, Ya. D.; Gzhitskii, S. Z. (Ukr. Nauchno-Issled. Inst. Fiziol Biokhim S-kh Zhivotn. Lvov, USSR), Dokl. Veses. Akad. Skh. Nauk 1976; Chem Abstracts, 86:15522w.

*Primary Examiner*—Helen M. S. Sneed
*Assistant Examiner*—Chung K. Pak
*Attorney, Agent, or Firm*—Schmidt, Johnson, Hovey & Williams

[57] ABSTRACT

An improved, low cost, energy efficient extrusion device and method for processing of cellulose, hemicellulose, and like fiber-bearing materials is described which includes a pretreatment extrusion zone and a reaction extrusion zone separated by a pressure sensitive variable die. The method hereof includes the steps of extruding cellulosic material through the pretreatment zone at an elevated pressure and temperature, passing the material into the reaction zone where it is mixed with an acid and is processed at a lower pressure and temperature than in the pretreatment zone, and extruding the material through a final extrusion die. The surging and blowing usually experienced with extrusion of fibrous material is drastically reduced by the unique construction of the extruder die members. The cellulosic material may be hydrolyzed to simple sugars in accordance with the method and apparatus hereof with a minimum of acid degradation of the extrusion equipment. The sugars produced from the cellulosic material may in turn be converted into ethanol or other usable fuels by the process of fermentation.

4 Claims, 10 Drawing Figures

EXTRUSION METHOD AND APPARATUS FOR ACID TREATMENT OF CELLULOSIC MATERIALS

This application is a continuation of application Ser. No. 06/697,416, filed 1/13/85, now abandoned which was in turn a continuation of Ser. No. 06/467,878, filed Feb. 18, 1983, now abandoned.

BACKGROUND OF THE INVENTION

1. Field of the Invention

This invention relates to the field of acid hydrolysis extrusion technology. In particular, it pertains to a method and apparatus for the acid treatment of cellulosic materials and employs an extrusion apparatus having a pretreatment zone, a reaction zone, a plurality of acid injection ports associated with the reaction zone, and a pressure sensitive, variable die separating the pretreatment and reaction zones. A unique die construction having a frustoconical orifice of specified pitch is provided that virtually eliminates the surging and blowing usually experienced during the extrusion of cellulosic or like fibrous materials.

2. Description of the Prior Art

Extrusion hydrolysis of cellulosic material has been recognized as a possible economical method for hydrolyzing large quantities of cellulose into simple sugars suitable for conversion into liquid fuels by fermentation. The presence of an acid solution within an extruder barrel at elevated pressures and temperatures, however, has in the past presented a problem of rapid deterioration of the component parts of the extruder. Elevated temperatures and pressures are required in cellulose hydrolysis not only to effect the hydrolysis, but to break down the coarse cellulosic material to a texture that is amenable to the controlled hydrolysis of the material. Also, the extrusion of cellulose or like fibrous materials has in the past been accompanied by severe surging and blowing of the material in the extruder barrel, making the extrusion process difficult or impossible to control.

A method and apparatus for the extrusion hydrolysis of cellulosic material that would economically process large quantities of cellulose at elevated temperatures and pressures, eliminate surging and blowing, and minimize the acid deterioration of the component parts of the extruder, would be a decided advantage.

SUMMARY OF THE INVENTION

The problems outlined above are in large measure solved by the extrusion method and apparatus for acid treatment of cellulosic material in accordance with the present invention. That is to say, the extrusion method and apparatus hereof is capable of economically hydrolyzing large quantities of cellulosic material while minimizing the acid deterioration of the extruder component parts.

The extrusion apparatus in accordance with the present invention broadly includes a first pretreatment extrusion zone comprising a barrel section and an extruder screw, a second reaction extrusion zone comprising a barrel section and extruder screw, a pressure sensitive, variable extrusion die interposed between the pretreatment and reaction zone, a second pressure sensitive, variable die associated with the reaction zone, and at least one acid injection port in the reaction extrusion zone. In preferred embodiments, the pretreatment zone has a length of at least about three times the length of the reaction zone. The extrusion die members include frustoconical orifice defining surfaces. The pitch of the orifice defining surfaces is especially designed to maximize the processing of cellulose and like fibrous material, while virtually eliminating surging and blowing.

The method hereof includes the steps of passing a quantity of cellulosic material through a first extrusion zone at an elevated pressure and temperature, extruding the material through a first, pressure sensitive variable die, passing the material through a second extrusion zone at a lower pressure and temperature than the first zone, mixing an acid solution with the material while the material is in the second extrusion zone, and extruding the material through a second, pressure sensitive, variable die. The use of a frustoconical die member of a specified pitch reduces surging and blowing during start up operations, as does the use of rotating, selfcleaning bullets received within the die members.

DESCRIPTION OF THE PREFERRED EMBODIMENTS

1. Extrusion Apparatus

Figure 1:
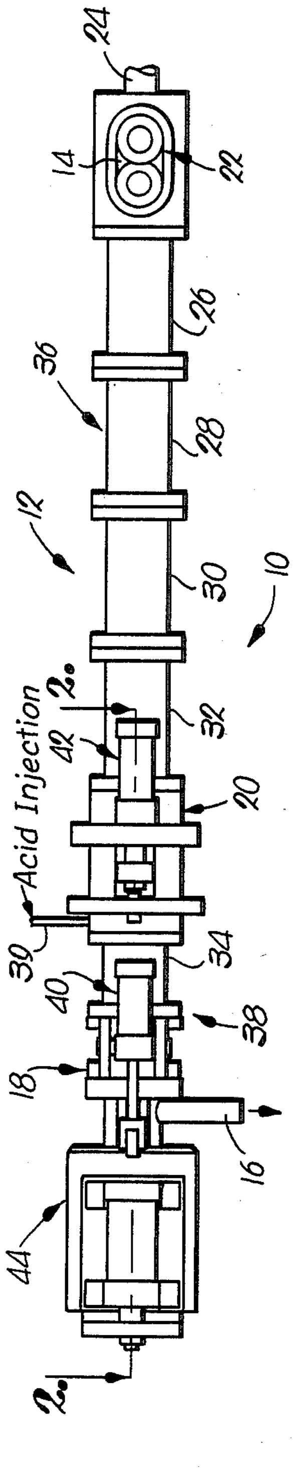
FIG. 1 is a plan view of an extrusion apparatus in accordance with the present invention.
Figure 6:
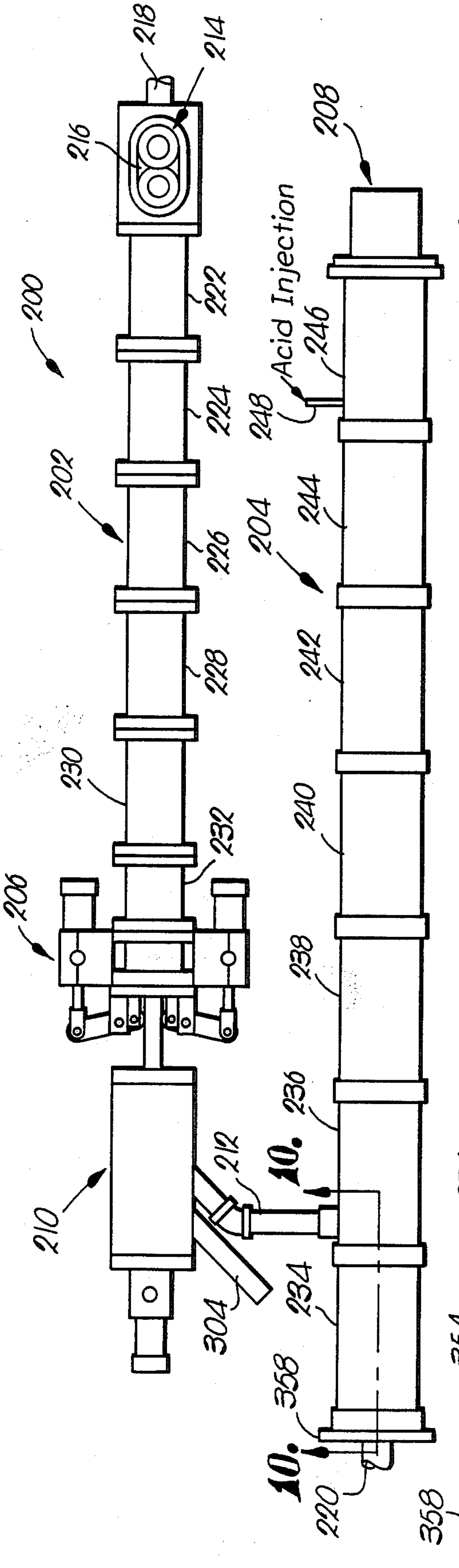
FIG. 6 is a plan view of an extrusion apparatus in accordance with a second embodiment of the present invention.

Turning to the drawings, an overall extrusion apparatus 10 is illustrated in FIG. 1 and includes an elongated, multiple section tubular barrel 12, a material inlet 14, a material outlet 16, an end die 18, and an intermediate die 20. A twin screw feeder mechanism 22 is connected to the material inlet, and a drive shaft 24 extends from the barrel 12.

The barrel 12 (See FIG. 1) includes a total of five axially aligned tubular heads 26 through 34. Heads 26 through 32 comprise a first, pretreatment extrusion zone 36, and head 32 comprises a second, reaction extrusion zone 38. Reaction extrusion zone 38 includes an acid injection port and associated conduit 39. First and second die shifting mechanisms 40, 42 are associated with the end die 18 and intermediate die 20 respectively. Hydraulically operated motor 44 is connected to end die 18.

Figure 2:
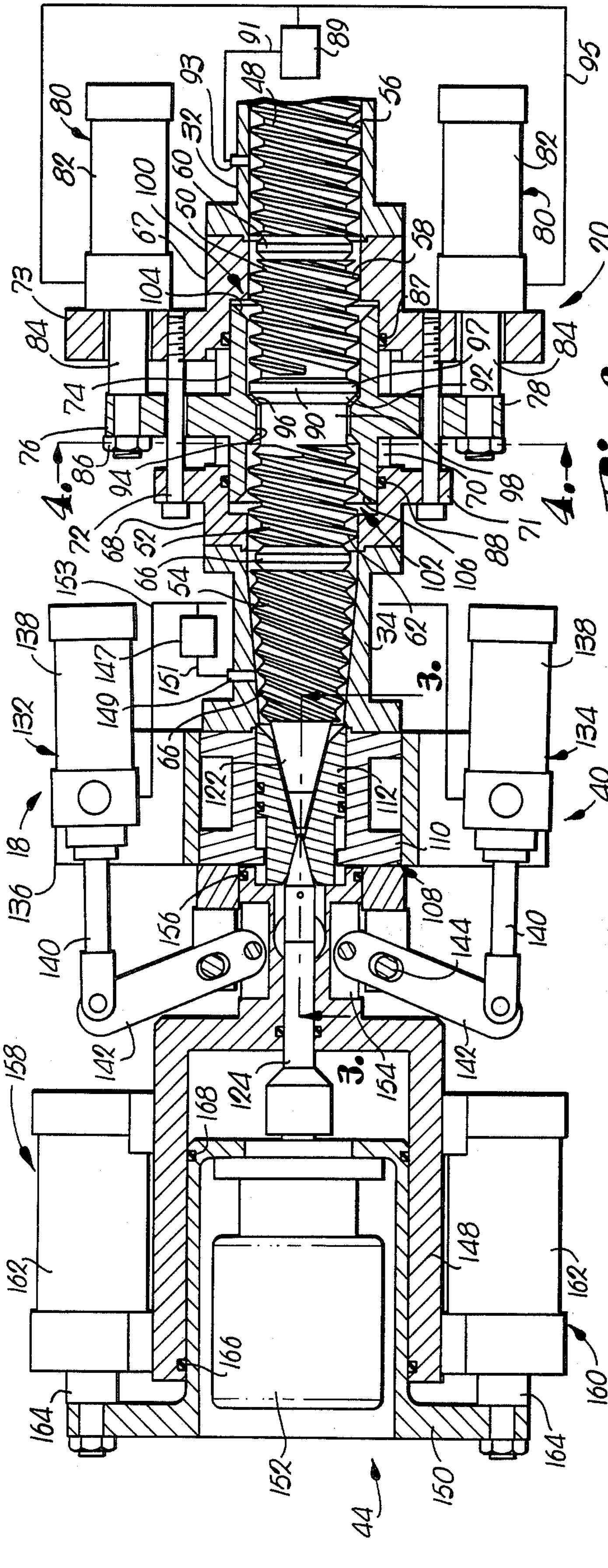
FIG. 2 is an enlarged, fragmentary, sectional view taken along line 2—2 of FIG. 1.

Referring to FIG. 2, it will be seen that a multiple section, axially rotatable, flighted extruder screw 46, comprised of screw sections 48, 50, 52, 54, is received within the barrel 12. Screw sections 48, 50 are of a constant diameter throughout their length, and include peripheral double helical flights 56, 58. Screw sections 48, 50 are separated by a constant diameter steam lock die 60. Screw section 52 includes a peripheral double helical flight 62 and is separated from screw member 54 by a constant diameter steam lock die 64. Screw section 54 is generally tapered in configuration, and includes a peripheral helical triple flight 66. The bore of head section 34 is likewise tapered to receive screw section 54 therein.

Intermediate die 20 (see FIG. 2) includes a pair of spaced apart, tubular end collars 67, 68. End collar 68 includes a tubular spacer 70 that abuts end collar 67, and an annular flange 71. End collar 67 includes a rectangular plate 73 extending therefrom. Eight pins 72 extend through apertures in flange 71 and are threadably received within plate 73. Shiftable, tubular sleeve 74 is received within end collars 67, 68, bridging the distance therebetween. A pair of opposed tabs 76, 78 extend radially outwardly from sleeve 74 through slots in spacer 70, each tab including a pin receiving and guiding aperture. A pair of diametrically spaced apart hydraulic cylinder and piston assemblies 80 are mounted to end collar 67. The cylinder 82 of each assembly 80 is fixedly mounted to the end collar, 67, and the piston 84 of each assembly 80 is shiftable relative to the end collar 67. The pistons 84 of assemblies 80 are connected by nuts 86 to respective tabs 76, 78 of sleeve 74 for shifting thereof. Sealing rings 87, 88 are received within end collars 67, 68 respectively for the pressure tight sealing of sleeve 74 within the end collars. Pressure actuated control box 89 is connected by line 91 to a pressure sensitive detection device 93 received within barrel section 32, and to hydraulic assemblies 80, 82 by line 95.

Figure 4:
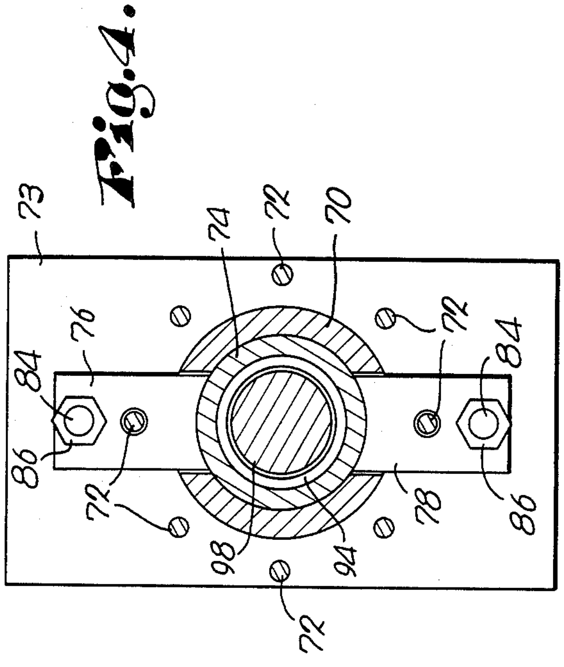
FIG. 4 is a sectional view of the intermediate die taken along line 4—4 of FIG. 2.

Screw section 50 (see FIG. 2) extends within sleeve 74 (see FIGS. 2 and 4), and includes an annular radially outwardly extending projection 90. Projection 90 includes a frustoconical surface 92 and a circular outer face 97. Sleeve 74 on the other hand includes an internally extending, annular ridge or projection 94. Ridge 94 includes a continuous seating surface 96 complemental with the surface 92 of screw projection 90. Screw section 52 includes a smooth non-flighted, cylindrical portion 98 extending from frustoconical surface 92 of projection 90. The opposed material input end 100, and output end 102 of sleeve 74 include tapered frustoconical surfaces 104, 106, respectively.

End die 18 (see FIG. 3) includes a head section 108 comprised of an outer, generally cylindrical member 110 and an inner element 112 shiftably received within outer member 110. Sealing rings 114 are received within annular grooves of inner member 112, and maintain a pressure tight seal between inner and outer members 110, 112. Inner head member 112 includes an internal bore comprised of opposed frustoconical surfaces 116, 118 having intersecting apexes. The pitch of frustoconical surface 116, as measured from the central axis of member 112 is advantageously not less than about 10° and not more than about 25°, and is preferably about 14°. The material input end of die 18 is comprised of a leading, frustoconical surface 120 continuous with the surface 116, but of shallower pitch than the pitch of the surface 116. The material output end of die 18 includes trailing surface 121 continuous with bore-defining surface 118, but of a shallower pitch than the pitch of surface 118. Frustoconical bullet 122 extends within input end 120 of die 18, and is shaped for seating relationship with surface 116 of inner head member 112. Bullet 122 is configured with an inlet diameter 123 and a discharge diameter 125. The ratio of these two diameters is advantageously not less than 1.22 to 1, not more than 17 to 1, and is preferably about 5.5 to 1. Poppet 124 extends within the material output end of die 18, and is shaped for seating relationship with surface 118 of die inner head member 112. Poppet 124 includes bored through channel 126 having an axially oriented inlet portion 128, and a radially oriented output portion 130.

Hydraulic piston and cylinder assemblies 132, 134 (see FIG. 2) are coupled to head 108 (see FIGS. 2,3 and 5) by mounting collar 136. The cylinders 138 of each assembly 132, 134 are pivotally coupled to the collar 136, and the piston rods 140 of each assembly 132, 134 are shiftable relative to outer member 110 of the die head 108. A bracket 142 is pivotally connected to each rod 140. Each bracket 142 is pivotal about a respective support rod 144. Support rods 144 are maintained in fixed, spaced apart relationship to die outer head member 110 by structure 146. Pressure actuated control box 147 is connected to a pressure sensitive detector 149 by line 151 to barrel section 34, and to hydraulic assembly 138 by line 153.

Hydraulic motor assembly 44 (see FIG. 2) includes outer casing 148, inner casing 150 shiftably received within outer casing 148, and hydraulic motor 122 fixedly mounted within inner casing 148. Outer casing 148 includes an extension 154 shiftably extending within structure 146 of end die 18. Sealing ring 156 maintains extension 154 and structure 146 in pressure tight sealing relationship. Poppet 124 extends through extension 154, and is connected to motor 152 for rotation thereby.

Hydraulic piston and cylinder assemblies 158, 160 (see FIG. 2) are mounted on outer casing 148 of hydraulic motor assembly 44. Each cylinder 162 of assemblies 158, 160 is fixedly attached to the outer casing 148, and each piston 164 of the assemblies 158, 160 is attached to the motor assembly inner casing 150 for shifting of the inner casing 150 and motor 152 relative to the outer casing 148. Sealing rings 166, 168 maintain inner and outer motor assembly casings 150, 148 in pressure tight relationship.

Figure 5:
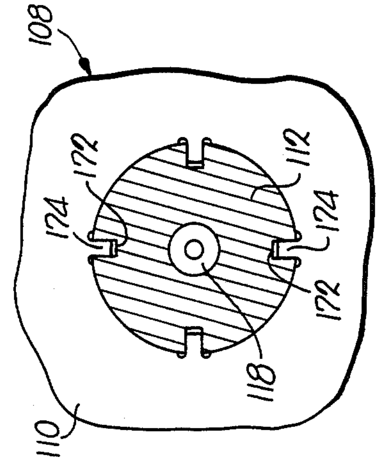
FIG. 5 is a fragmentary, sectional view of the end die taken along line 5—5 of FIG. 3.
Figure 3:
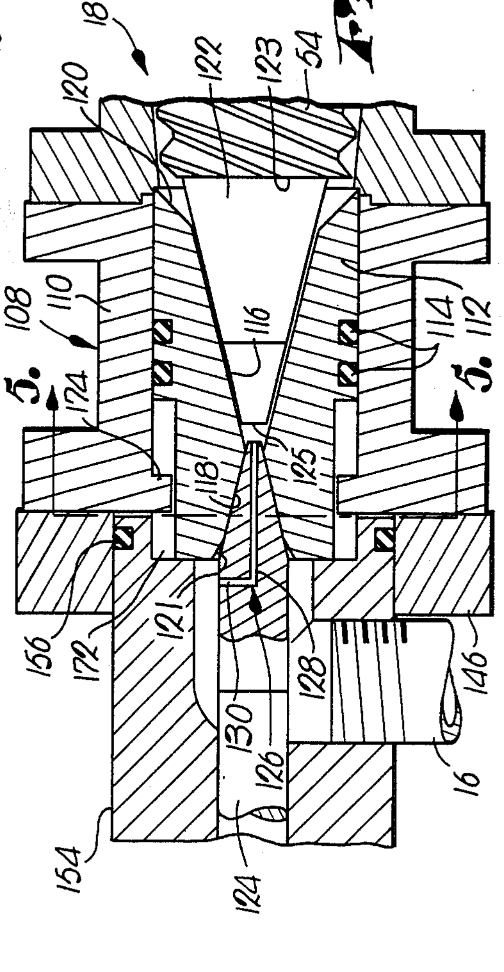
FIG. 3 is a fragmentary, sectional view of the end die of the extruder apparatus depicted in FIG. 1 and taken along line 3—3 of FIG. 2.

Referring in particular to FIGS. 3 and 5, it will be seen that inner element 112 of die 18 includes four spaced apart grooves 172. Radially inwardly extending tabs 174 project from outer head member 110 of die 18, and are shiftably received within grooves 172.

2. Second Embodiment of the Extrusion Apparatus

Referring now to FIGS. 6 through 9, a second embodiment of an extrusion apparatus 200 in accordance with the present invention will be described. The extrusion apparatus 200 includes first barrel 202, second barrel 204, intermediate die 206, end die 208, valve 210, and conduit 212 interconnecting the valve 210 and second barrel 204.

Feeder mechanism 214 (see FIG. 6) is connected to material inlet 216. Drive shaft 218 extends from barrel 202, and drive shaft 220 extends from barrel 204. Barrel 202 is comprised of a plurality of axially aligned, tubular sections 222 through 232, and barrel 204 is likewise comprised of a plurality of tubular, axially aligned barrel sections 234 through 246. Section 246 includes one acid injection port and associated conduit 248. A flighted, axially rotatable, sectional screw is received within each barrel.

Figure 7:
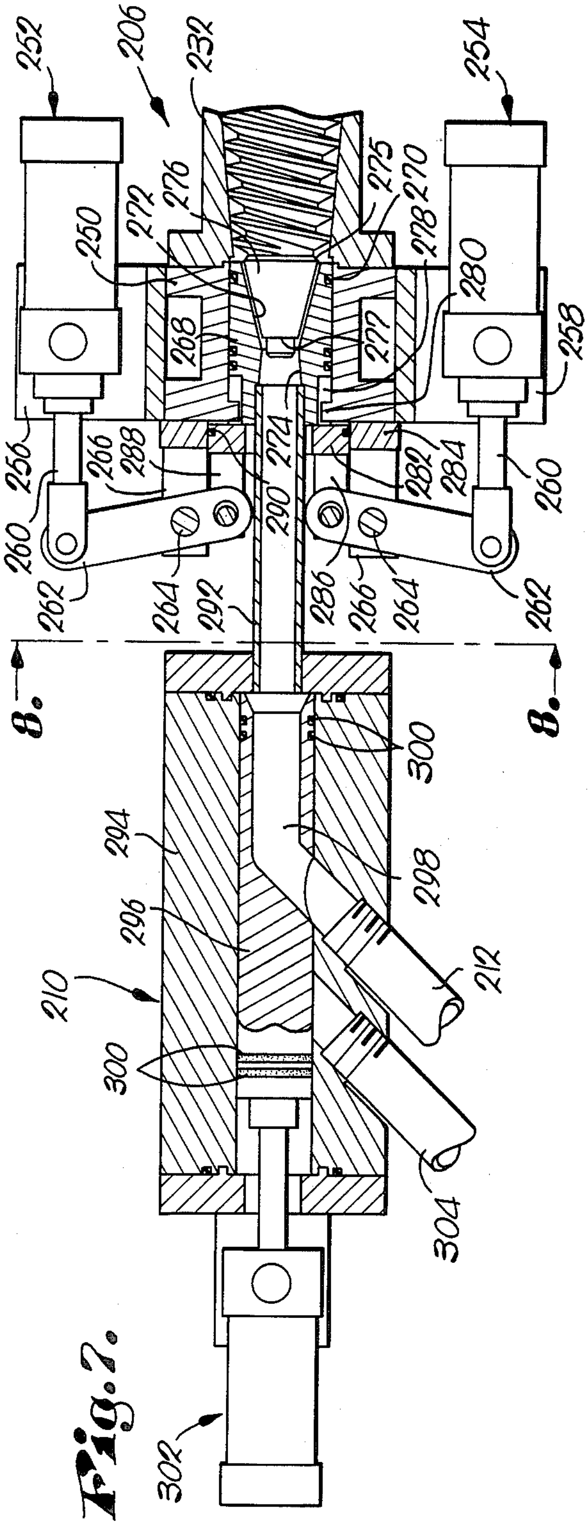
FIG. 7 is a fragmentary, sectional view of the intermediate die and valve means of an extrusion apparatus in accordance with the second embodiment.
Figure 8:
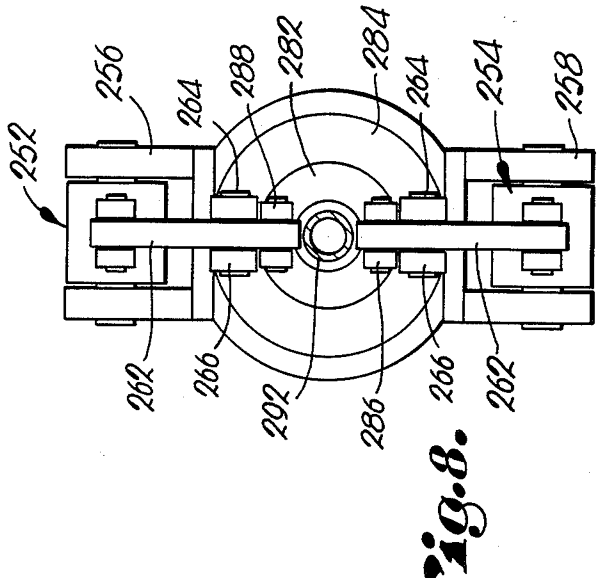
FIG. 8 is a sectional view of the intermediate die of the second embodiment taken along line 8—8 of FIG. 7.

Referring to FIG. 7, intermediate die section 206 includes head section 250. Hydraulic piston and cylinder assemblies 252, 254 are pivotally mounted to the head section 250 by U-shaped supports 256, 258 respectively. Each assembly 252, 254 includes a shiftable piston rod 260. A bracket 262 is pivotally mounted to the end of each piston rod 260. The brackets 262 are respectively mounted on pivot rods 264, which are maintained in fixed spaced apart relationship with die head 250 by support structure 266.

The die 206 (see FIG. 7) includes an inner member 268, shiftably received within head section 250. A plurality of sealing rings 270 maintain the die head 250 and inner member 268 in pressure tight relationship. Member 268 includes an internal bore having first and second frustoconical surfaces 272, 274 having intersecting apexes. The pitch of surface 272, as measured from the central axis of member 268 is advantageously not less than about 10° and not more than about 25°, and is preferably about 14°. Surface 272 provides a seat for frustoconical bullet 276 extending within member 268. Bullet 276 is configured with an inlet diameter 275, and a discharge diameter 277, the ratio of these two diameters is advantageously not less than 1.22 to 1, and not more than 17 to 1, and is preferably about 2.07 to 1. Member 268 includes spaced apart slots 278, which receive, in sliding relationship, radially inwardly directed tabs 280 projecting from die head section 250.

Annular end fitting 282 (see FIG. 7) is shiftably received within support 284. Support 284 is fixedly connected to die head 250. Fitting 282 includes spaced apart struts 286, 288, each pivotally coupled to a respective bracket 262. Sealing ring 290 maintains fitting 282 and support 284 in pressure tight relationship.

The outlet end of intermediate die 206 (see FIGS. 6 and 7) is connected to valve 210 via pipe 292. Valve 210 includes outer casing 294 and internal shiftable element 296. Element 296 includes angled channel 298. A plurality of sealing rings 300 maintain the element 296 and casing 294 in pressure tight relationship. Element 296 is connected to piston and cylinder assembly 302 for shifting thereof. Channel 298 is depicted in FIG. 7 as being aligned with conduit 212, but may be shifted by assembly 302 so as to be aligned with exhaust conduit 304.

Figure 9:
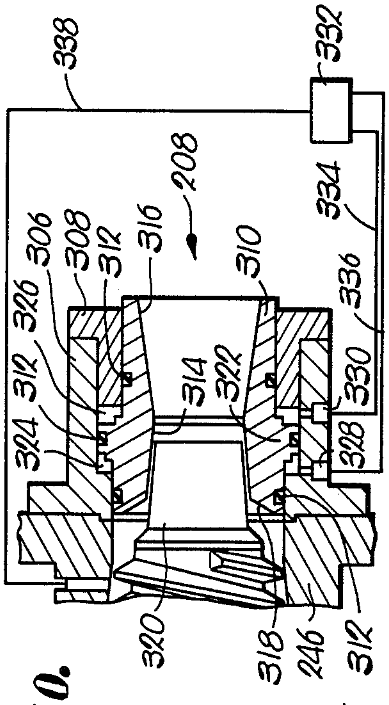
FIG. 9 is a sectional view of a variable end die for the extrusion apparatus in accordance with the second embodiment of the invention.

End die 208 (see FIG. 9) may be a conventional die having a fixed orifice. Alternatively, die 208 may be a variable die as depicted in FIG. 9. The variable die 208 includes outer casing 306 and end fitting 308. Die head member 310 is shiftably received within outer casing 306, and a plurality of sealing rings 312 maintain the head 310 in pressure tight relationship with casing 306 and end fitting 308. Head 310 has an internal bore including a pair of frustoconical surfaces 314, 316 having intersecting apexes. The inlet end of head 310 includes a frustoconical surface 318 continuous with surface 314, but of shallower pitch than the pitch of surface 314. Bullet 320 extends within the bore and is configured so as to complementally seat with surface 314. Head 310 includes a radially outwardly extending annular projection 322 that defines two annular chambers 324, 326 between the head 310 and outer casing 306. Channels 328 and 330 extend radially outwardly through head 310 from chambers 324, 326 respectively, and are connected to pressure sensitive control box 332 via lines 334 and 336. Control box 332 is connected to barrel section 246 via line 338, and is actuated in response to the pressure within section 246 for shifting die head member 310.

Figure 10:
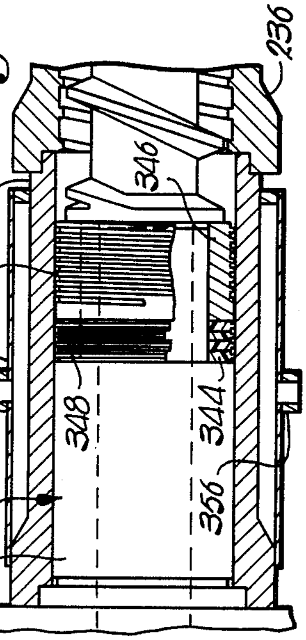
FIG. 10 is a fragmentary, sectional view of a head seal for the second barrel of an extrusion apparatus in accordance with the second embodiment of the invention.

The head seal 340 for the second extrusion barrel 204 is depicted in cross section in FIG. 10. The seal 340 is received within barrel section 234 and includes a main carrier member 342, a plurality of Teflon seal rings 344, and a retainer 346. The seal 340 is capable of containing material within the barrel 204 up to a pressure of at least 1,000 p.s.i.g.

The seal carrier 342 (see FIG. 10) is keyed to the shaft 220 (see FIG. 6) for rotation therewith. Each of the Teflon seal rings 344 includes a circumferential lip 348 that engages the internal sidewall of the barrel section 234 such that the respective lips of the rings 344 provide a plurality of pressure locks. The retainer 346 is keyed to the carrier 342 for rotation therewith, and includes flighting 350. The pitch direction of the flighting 350 is of the same direction as the pitch of the internal screw sections of the second barrel, such that material that is wedged between the retainer 346 and sidewall of the barrel section 234 is directed forwardly and into the barrel. The barrel section 234 includes a water jacket 352 having cooling fluid inlet and outlet 354, 356. The end of barrel section 234 is capped by end collar 358. Shaft 220 is received through a centered aperture in end collar 358.

3. Operation of the First Embodiment

Cellulosic material is fed into the extruder barrel 12 of extrusion apparatus 10 by the feeder assembly 22, and is advanced therethrough by the rotation of the screw sections within the barrel.

Intermediate die member 20 defines a restricted orifice through which the material must pass as it is advanced through the extruder toward and through final die 18. The size of this intermediate restricted orifice may be varied by shifting the sleeve 74 of the die 20 within the end collars 67, 68. Referring to FIG. 2, surface 92 of projection 90 will seat against surface 96 of sleeve projection 94 and essentially close the extrusion opening when the sleeve 74 is shifted rightwardly. Shifting of the sleeve 74 to the left will increase the size of the extrusion opening. The temperature and pressure of the material within the first extrusion zone 36 of barrel 12 can therefore be controlled by varying the size of the extrusion opening presented by die 20.

Material within the extrusion apparatus 10 experiences a pressure drop after it passes through intermediate die 20, and is transferred through the second extrusion zone 34 of barrel 12 by screw section member 52, 54. An acid solution may be injected into the material through the acid injection conduit 39. It will be appreciated that no acid will be transferred into the first extrusion zone 36 because of the pressure drop created across intermediate die 20.

End die 18 comprises a second restricted orifice through which the material within the barrel 12 must pass. The size of the restricted orifice presented by end die 18 may be varied by operation of piston and cylinder assemblies 132, 134, 158 and 160 in the manner described below.

Referring to FIG. 2, it will be appreciated that when the piston rods 140 of piston and cylinder assemblies 132, 134 are retracted into their respective cylinders 138, the entire motor assembly 44 and member 112 are shifted leftwardly. Member 112 is unseated from bullet 122 as it shifts leftwardly, and the effective size of the restricted orifice defined by die member 18 is thereby increased.

Poppet 124 may be shifted leftwardly in relationship to the member 112, independently of the movement of member 112 relative to the bullet 122. Again referring to FIG. 2, it will be appreciated that extension of rods 164 of piston and cylinder assembly 158, 160 will shift the inner casing 150 of motor assembly 44 leftwardly. Poppet 124 will shift leftwardly along with the inner motor casing 150, thereby retracting the poppet 124 from the seating surface 118 of member 112.

Poppet 124 may be rotated during operation by hydraulic motor 152. Rotation of the poppet 124 may be effected to vary the nature of the extrudate, and also provides a means for cleaning the seat between the poppet 124 and surface 118, thereby providing a positive seal.

4. Operation of the Second Embodiment of the Invention

Operation of the second embodiment of the present invention will now be described with reference to FIGS. 6 through 9. Cellulosic material is introduced into the inlet end 216 of extrusion apparatus 200 by feeder mechanism 214, and is advanced through the extruder by the rotation of the screw sections within the extruder barrel. Intermediate die section 206 comprises a first restricted orifice through which the material must pass, thereby subjecting the material within the barrel section 202 to pressure and temperature increases.

Member 268 of intermediate die section 206 may be shifted relative to bullet 276 by operation of piston and cylinder assemblies 252, 254. Referring to FIG. 7, it will be appreciated that retraction of piston rods 260 within respective cylinders of hydraulic assemblies 252, 254 will cause shifting of member 268 to the left. The restricted orifice defined between member 268 and bullet 276 is effectively increased in size as member 268 is shifted leftwardly. As the material passes through the orifice defined by the intermediate die 206, it experiences a pressure drop, and is conveyed through conduit 292 to valve 210.

Valve 210 may be positioned in the configuration depicted in FIG. 7 such that the material received through conduit 292 is transferred into the second barrel 204, through conduit 212. Alternatively, element 296 of valve 210 may be shifted leftwardly by the hydraulic assembly 302 such that material is transferred to the atmosphere through exhaust conduit 304.

Material transferred to the second barrel section 204 is transferred through the barrel by the rotation of the screw sections within the barrel. An acid solution is injected through conduit 248 into barrel section 246 and is mixed by the rotation of the screw section with the material in the barrel.

End die section 208 comprises a second restricted orifice through which the material must pass. Head section 310 may be shifted in relation to outer casing 306 so as to vary the effective size of the restricted orifice presented by end die 208. In this regard, chambers 324, 326 of die section 208 are filled with hydraulic fluid. Removal of fluid from one chamber, and simultaneous injection of fluid into the other chamber, will cause the die section 310 to correspondingly shift either left or right. Shifting of the head section 310 to the right relative to bullet 320 increases the effective size of the restricted orifice defined by the die 208, and shifting to the left correspondingly decreases the size of the orifice.

5. The Extrusion Method

The acid hydrolysis of cellulosic or hemicellulosic materials may be accomplished on a large scale through the use of the described apparatus, without undue acid deterioration of the apparatus. This is due primarily to the fact that pretreatment of the cellulosic material can be accomplished at high pressures and temperatures within the pretreatment zone in the absence of an acid solution, and the reaction of the cellulosic material with the acid solution can be accomplished at lower pressures and temperatures, and for short durations, within the second extrusion zone.

The extrusion of cellulosic and like fibrous materials in conventional extruders is typically accompanied by surging and blowing of the material through the extruder, particularly during the initial start up. Surging and blowing is caused due to the fact that the extrusion orifice must be gradually decreased during start up in order to attain the elevated pressure and temperature within the extruder barrel required for the processing of fibrous materials. The course, fibrous nature of cellulose and like material, however, easily clogs small extrusion orifices. The courseness of the material is broken down by elevated pressure and temperature within the extruder barrel once steady state operation is attained. The clogging problem, however, is particularly severe during start up, since the material presented to the orifice has not been broken down and is still in a course, fibrous condition.

Clogging of the extrusion orifices during the start up phase is prevented in the present invention by providing die members having frustoconical orifice defining surfaces within which a rotating bullet is received. The rotation of the bullet tends to work course fibrous material through the orifice. Moreover, it has been found that a frustoconical die member having a pitch of about 14 degrees drastically reduces surging and blowing of fibrous material being processed through the extruder. The rotation of a bullet within a frustoconical die member having a pitch of about 14 degrees presents a small orifice which causes elevated temperatures and pressures to be attained within the extruder barrel, without causing surging and blowing of material through the extrusion apparatus. In particular, bullet 122 rotates within die member 112 in the first embodiment of the invention, and bullet 276 rotates within die member 268 in the second embodiment of the invention.

Referring to the first embodiment, as depicted in FIGS. 1–5, it will be appreciated that bullet 122 must be seated relatively tightly within die member 112 in order to present an extrusion orifice small enough to provide the elevated temperatures and pressures necessary for processing of cellulosic materials. The closeness of the seat between bullet 122 and die member 112 can lead to rapid deterioration of the bullet 122 and die member 112 once acid is injected into the second extrusion zone 38 via conduit 39. The extrudate within the second extrusion zone 38, however, once steady state operating parameters are achieved, will no longer be of a course fibrous nature and will freely flow through a small extrusion orifice. For this reason, the extrusion orifice presented by rotating bullet 122 and die member 112 may be replaced by orifice presenting structure that does not include rotating or shifting parts. Such an orifice defining structure is provided by poppet 124.

Poppet 124 is retracted from die member 112 during the start up phase of extrusion operations. Operation of piston and cylinder assemblies 158, 160 can be operated to seat the poppet 124 in die member 112 once steady state operating conditions have been attained within the extruder barrel. Channel 126 of poppet 124 will then present a small extrusion orifice which will maintain elevated temperatures and pressures within the second extrusion zone 38. Piston and cylinder assemblies 132, 134 may then be operated to unseat die member 112 from the rotating bullet 122.

It will be appreciated that poppet 124 may be rotated by hydraulic motor 152 in order to clean the seat between the poppet 124 and die member 112, but rotation of the poppet 124 would normally not be effected during extrusion operations.

Referring to FIG. 7, the manner in which surging and blowing is eliminated in the second embodiment will now be described. During start up operations, valve 210 is positioned such that the extrudate flowing from barrel 202 is exited to the atmosphere through conduit 304. The combination of the pitch angle of surface 272 of die member 268 (14 degrees), along with the rotation of bullet 276 within the member 278 and the ability to gradually decrease the size of the orifice as the coarseness of the material is reduced, inhibits surging and blowing for the reasons described above in conjunction with the first embodiment. Until steady state operations are achieved, the course fibrous material being processed is exited to the atmosphere, and therefore cannot clog the extrusion orifice presented by die 208. Once steady state operating conditions are achieved, the elevated temperature and pressure within barrel 200 breaks down the fibers in the extruded material, and valve 210 may be safely shifted to introduce the extruded material to the second barrel 204 via conduit 212. It will be appreciated that acid is inJected into the apparatus 200 at fluid inlet 248, which is well down from the die 206. For this reason, the die 206 does not operate in the presence of an acid solution, and continued rotation of bullet 276 within die member 268 does not lead to accelerated degradation of the die 206.

Pretreatment of the cellulosic material within the first extrusion zone should be accomplished within the temperature range of 200° F. to 600° F., and preferably within the range of 400° F. to 500° F. The pressure within the pretreatment zone may vary from 100 p.s.i.g. to 2500 p.s.i.g., and is preferably maintained between 750 p.s.i.g. to 1500 p.s.i.g. The residence time of material within the first extrusion zone should range from between 5 seconds to 300 seconds, and preferably 10 seconds to 90 seconds. The cellulosic material may be broken down to amorphous crystalline structure within the pretreatment zone, but such is not necessary.

In the extrusion of cellulose or like fiber-bearing materials, it is preferable to add moisture to the material prior to or during the extrusion process in order to achieve a total moisture content (i.e., native moisture plus added moisture), from about 2 percent to 80 percent by weight, and more preferably from about 20 percent to 50 percent, depending on the material being processed.

The differential in the operating pressures of the two extrusion zones is advantageously about 10 to 1,000 p.s.i.g. depending on the material being processed. The pressure differential is significant in that virtually none of the acid injected in the second extrusion zone is transferred into the first extrusion zone. Moreover, it will be appreciated that a pressure drop in the presence of acid leads to accelerated acid erosion rates of the barrel structure. In the present invention, acid is injected into the extrusion barrel downstream of the intra-barrel pressure drop. While the preferred pressure differential is as noted above, it is to be understood that any pressure differential that inhibits the backflow of acid into the pretreatment zone could be acceptable.

The hydrolysis of the cellulosic material is effected within the second, or reaction extrusion zone, upon the injection of an acid solution into the second extrusion zone. The concentration of the acid solution may vary from about between 0.5 percent to 96 percent by weight, depending on the type of material being processed. The temperature within the reaction extrusion zone should be maintained between 200 degrees F. and 550 degrees F., and preferably within the range of 400 degrees F. to 500 degrees F. The pressure within the reaction zone may vary from 100 p.s.i.g. to 1,500 p.s.i.g., and is preferably maintained between 500 p.s.i.g. and 1,000 p.s.i.g. The residence time of material within the reaction zone may range from between 2 seconds to 180 seconds, and preferably between 5 and 30 seconds, dependent upon the type and concentration of acid used.

The various variable dies described hereabove permit control of the extrusion process parameters during operation of the extruder apparatus. Moreover, the variable nature of dies 18 and 20 in the first embodiment and die 206 in the second embodiment help eliminate surging and blowing of material during start up operations, since the extrusion orifices they present can be increased in size responsive to pressure build ups caused by clogging of fibrous material in the orifices.

EXAMPLES

The following example illustrates the present invention, but nothing therein should be taken as a limitation upon the overall scope of the same.

Pine sawdust and poplar sawdust were processed in an extruder apparatus as described for the first embodiment of the invention in accordance with the mothod hereinabove described. Table 1 presents the operating parameters for the process, as well as the end product described in percent glucose.

TABLE I

| | | | Zone 1 | | | Zone 2 | | | | |
|---|---|---|---|---|---|---|---|---|---|---|
| Run | Material | Initial Moisture | Temp °F. | Press (psig) | Retention Time (Sec) | Temp °F. | Press (psig) | Retention Time (Sec) | % Acid | % Glucose |
| 1 | Pine Sawdust | 48[1] | 490 | 1500 | 60–65 | 450 | 1000 | 6–8 | 96[2] | 13[3] |
| 2 | Poplar Sawdust | 48[1] | 500 | 1300 | 60–65 | 425 | 750 | 6–8 | 3.8[2] | 20.4[3] |

[1]Percent moisture content wet basis (MCWB)
[2]Percent concentration of acid injection
[3]Percent glucose content of end product on a dry basis

We claim:

1. In an extruder having a material inlet and a material outlet, the combination comprising:

. a tubular extruder barrel having an outlet end and an outlet port defined therein;

a cylindrical, rotatable, axially fixed, flighted extruder screw received in said barrel, said screw having an end;

a first die element affixed to said end of said screw and extending outwardly through said outlet port;

a tubular head section having an input end and an output end and including an inner wall surface defining a continuous bore through said head section, said inner wall surface including an input surface defining an output surface defining an output end opening in said output end, said input surface being configured correspondingly with said first die element;

coupling means coupling said input end of said tubular head section with said outlet end of said barrel with said first die element extending at least partially into said input end opening and correspondingly aligned with said input surface, said coupling means including means for shifting said head section relative to said first die element for selectively varying the size of said input end opening;

a second die element, said output surface being configured correspondingly with said second die element;

mounting means mounting said second die element with said second die element extending at least partially into said output end opening and correspondingly aligned with said output surface, said mounting means for rotating said second die element about an axis of rotation and for shifting said second die element relative to said output surface for selectively varying the size of said output end opening; and means defining said material outlet in the vicinity of said outlet end opening, said second die element including structure defining an output end passageway communicating said bore with said material outlet.

2. The combination as set forth in claim 1, said first and second die elements each being of frustoconical configuration with said input end opening and said output end opening being correspondingly configured with said first die element and said second die element respectively.

3. The combination as set forth in claim 2, said input surface presenting a frustoconical seat, the pitch of said seat is being between about 10 degrees and about 25 degrees.

4. The combination as set forth in claim 3, said pitch of said seat is being about 14 degrees.

* * * * *